Jan. 23, 1945.  M. WALLACE  2,367,907
PANORAMIC RADIO RECEIVING SYSTEM
Filed Nov. 21, 1941  3 Sheets-Sheet 2
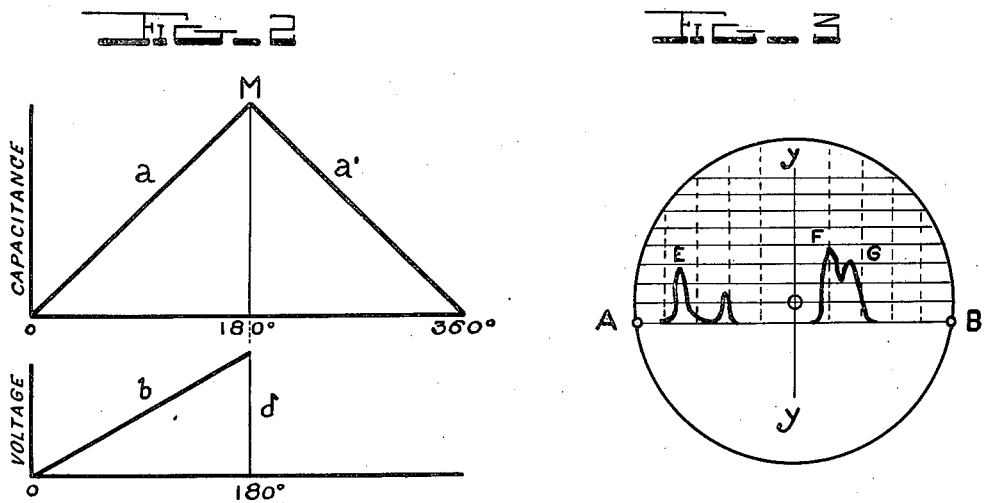
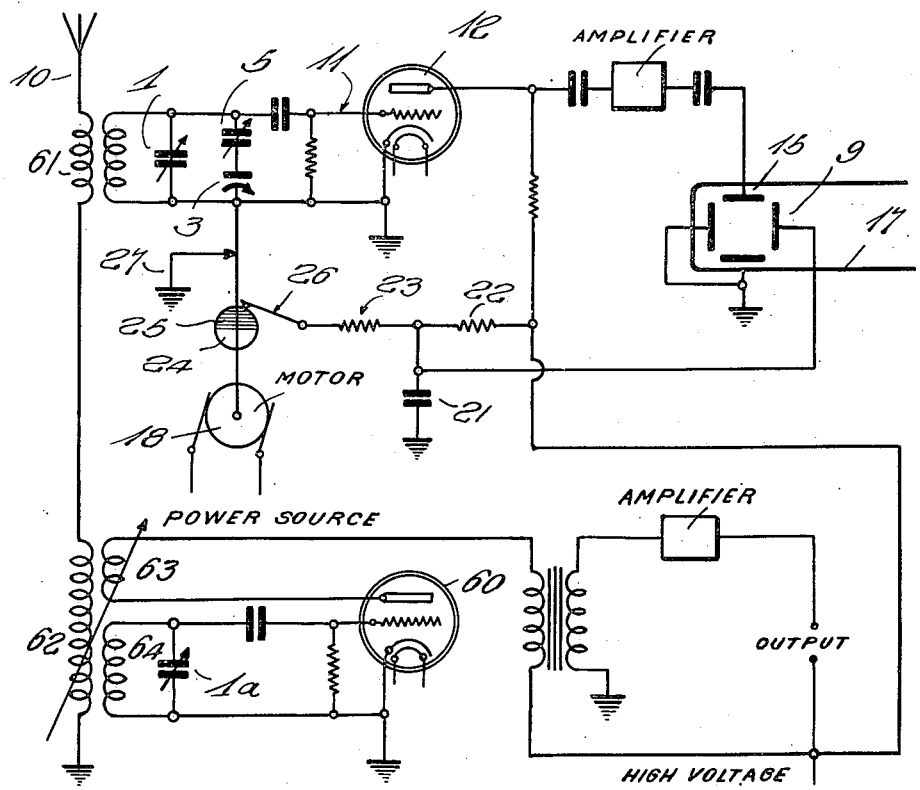
INVENTOR.
Marcel Wallace,
BY John B. Brady
ATTORNEY Jan. 23, 1945.    M. WALLACE    2,367,907
PANORAMIC RADIO RECEIVING SYSTEM
Filed Nov. 21, 1941    3 Sheets-Sheet 3
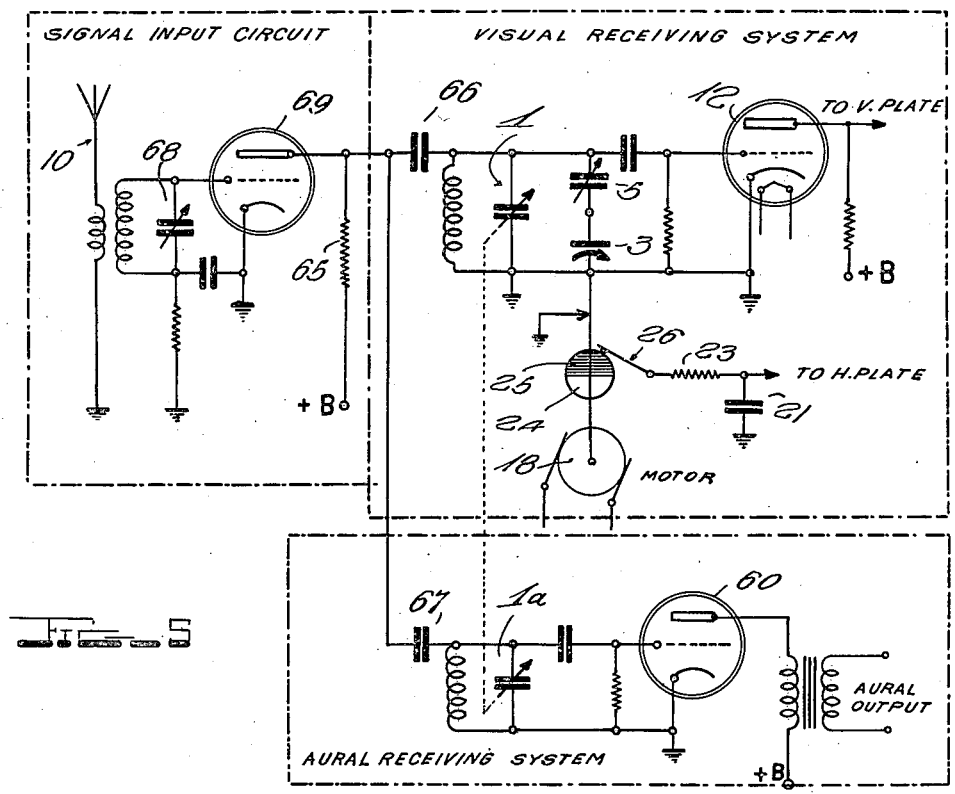
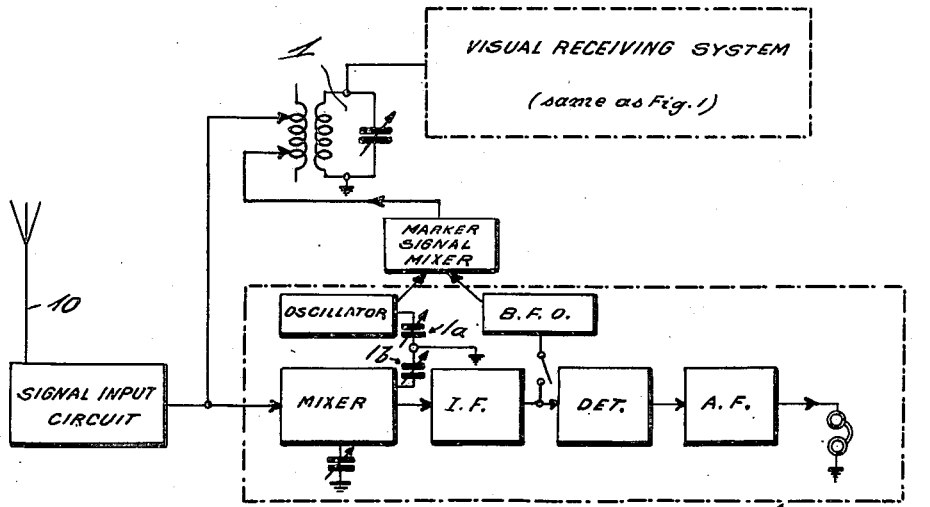
INVENTOR.
Marcel Wallace,
BY
John B. Brady
ATTORNEY Patented Jan. 23, 1945

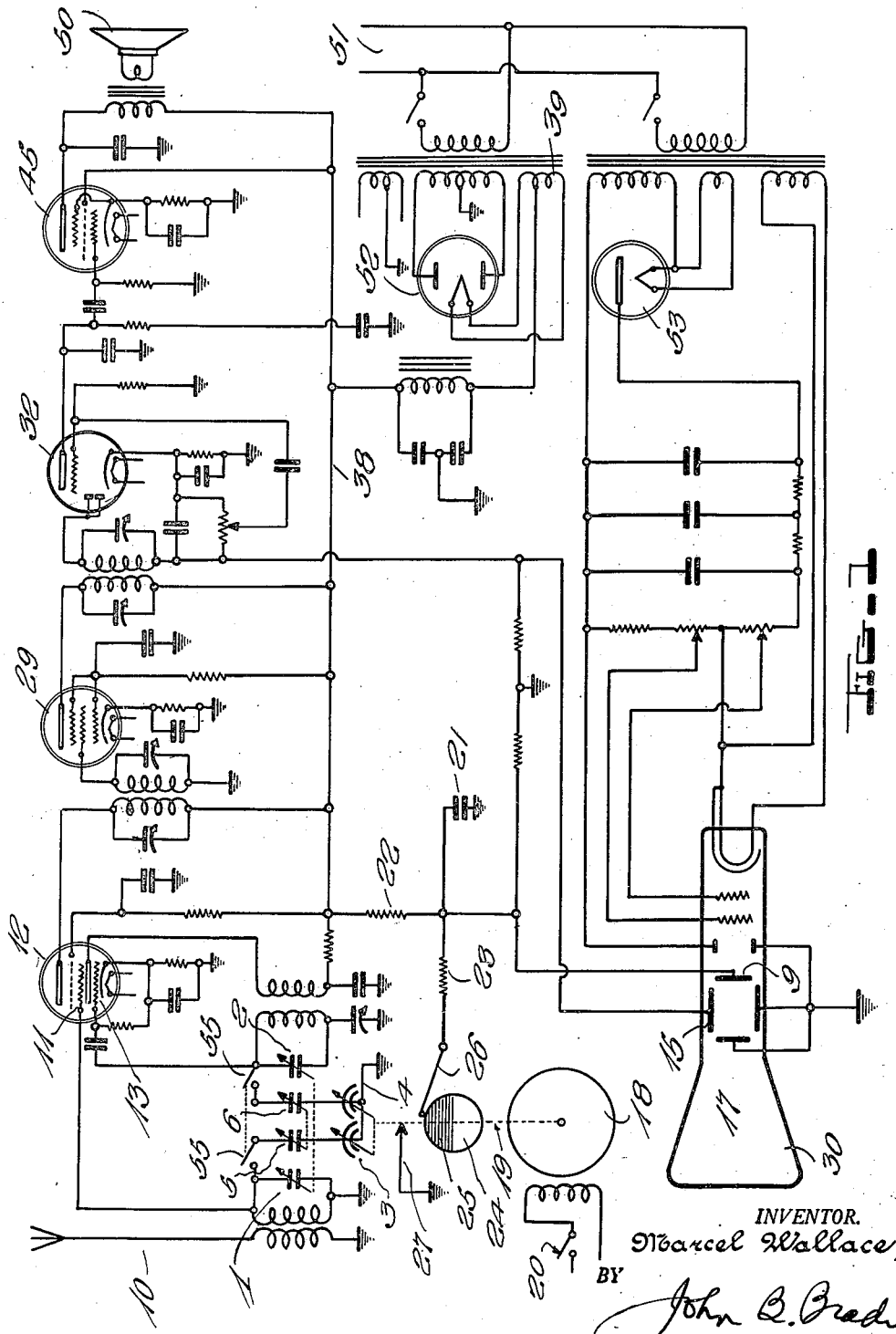

2,367,907

UNITED STATES PATENT OFFICE 2,367,907

PANORAMIC RADIO RECEIVING SYSTEM

Marcel Wallace, New York, N. Y., assignor, by mesne assignments, to himself, doing business as Panoramic Laboratories, New York, N. Y.

Application November 21, 1941, Serial No. 420,014

15 Claims. (Cl. 250—11.4)

My invention relates broadly to radio systems and more particularly to a panoramic system of radio reception.

This application is a continuation-in-part of my application Serial No. 196,520, filed March 17, 1938, for Panoramic radio receiving system, now Patent 2,279,151, issued April 7, 1942.

One of the objects of my invention is to provide a signal receiving system for integrating the effects of a multiplicity of simultaneously received signals and rendering the signals thus received visible in a manner whereby the relative characteristics of the several received signals may be readily compared.

Another object of my invention is to provide means in a radio receiving system for visually comparing the relative field strength of a multiplicity of transmitting stations received simultaneously in any prescribed area.

A further object of my invention is to provide a receiving system equipped with visual and acoustic indicating means and operative to sweep a band of frequencies adjustable at will for determining the characteristics of signals simultaneously receivable in a given area over any selected band or bands of frequencies.

Still another object of my invention is to provide a radio receiving system particularly adapted for operation on aircraft which will enable an observer to visually and aurally compare the characteristics of a plurality of simultaneously received signals to provide the pilot with accurate information for guiding the aircraft toward or away from or with respect to a multiplicity of radio range beacons, broadcasting stations or other signalling stations.

A further object of my invention is to provide a receiving system operative to visually reproduce a plurality of simultaneously received signals and visually compare the characteristics thereof in combination with aural receiving means, with means interconnected between said aural and visual means to identify the station which is being heard with one of the stations of a plurality of stations whose characteristics are visually observed.

Other and further objects of my invention reside in various combinations of circuits and instrumentalities and apparatus used in connection with the circuits of my invention, as set forth more fully in the specification hereinafter following by reference to the accompanying drawings in which:

Figure 1 is a diagrammatic view of one form of circuit embodying the principles of my invention; Fig. 2 illustrates characteristic curves showing the characteristics of the periodically varying tuning system employed in the circuit of my invention and the correlation of the automatic control circuits of the oscillograph employed in the receiving system; Fig. 3 is a typical diagram showing the wave form of a multiplicity of signals reproduced on the screen of the oscillograph of the panoramic receiver; Fig. 4 is a schematic circuit arrangement illustrating a composite panoramic receiver with means for simultaneously receiving both panoramic visual indication as well as aural indication of one of the stations visually indicated and also with means to show on the screen which one of the stations is being rendered audible; Fig. 5 represents a similar arrangement as shown on Fig. 4, with an additional tunable pre-amplifier; and Fig. 6 represents a block diagram showing the combination of a conventional super-heterodyne receiver, used for the aural reception, with a panoramic receiver, such as that of Fig. 1, for the visual reception.

My invention concerns a radio receiver for the simultaneous reception of a plurality of signals. An apparatus whose characteristic is that its instantaneous band pass which corresponds to its resonance curve, periodically and rapidly moves in a continuous manner over a band of frequencies between definite frequency limits, so that the operator perceives simultaneously the signals emitted by a plurality of radio stations in the chosen band of frequencies. The radio receiver is combined with means giving for the chosen band of frequencies, over which the resonance curve of the set moves periodically, a visual representation of all the signals received at their respective amplitudes. The means of visual representation are constituted by a cathode ray oscillograph tube combined with a source of voltage and automatic means causing an alternate sweep of the screen of this cathode ray tube in synchronism with the periodical variation of the instantaneous band of reception of the frequency bands chosen.

My invention also contemplates circuits which combine the ability of the observer to listen to any selected frequency and simultaneously see the relation thereof visually with respect to other signals.

Referring in detail to Fig. 1 of the drawings, I have shown a superheterodyne type of receiver including four stages of circuits arranged according to the usual method in which there is a detector and oscillator stage combined in the tube 12 followed by an intermediate frequency amplifier stage comprising tube 29 followed by a detector and the first audio frequency amplifier stage including tube 32 and the final audio frequency amplifier stage including tube 45. This final stage is connected with means for aural reproduction such as a loud speaker 50. The apparatus is energized from a source of alternating current 51 with the aid of rectifiers 52 and 53.

In this diagram the antenna 10 is inductively coupled with the first tuned circuit whose tuning elements are constituted by the variable condensers 1, 3 and 5, this circuit being connected to the control grid 11 of the tube 12. The local oscillations for the conversion of the frequency are generated in the usual manner in a circuit whose tuning elements are constituted by the variable condensers 2, 4 and 6, this circuit being connected to the grid 13 of the tube 12. The width of the band of frequencies covered by the periodic sweep is made variable by means modifying the maximum to minimum capacity ratio of the tuning element which is subjected to the periodical variation corresponding to this periodic displacement.

The variable condensers 3 and 4 are provided with rotors which can turn fully 360°. The two rotors which may be connected on the same shaft are rotated by the motor 18 the power supply to which being controlled by a switch 20. This motor can be advantageously the same as the one generating the electric current usually used on board of a plane. The limits of the frequency spectrum which can be received by this apparatus can be modified on one hand with the aid of the variable condensers 1 and 2, each of these being connected in parallel with one of the rotating condensers 3 and 4, and on the other hand with the aid of the variable condensers 5 and 6 which are connected in series respectively with each of the rotating condensers 3 and 4.

The resultant minimum capacity of a tuned circuit which includes the tuning elements 1, 3 and 5, can be modified with the aid of variable condenser 1 for a given position of condensers 3 and 5 corresponding to minimum capacity for these condensers.

The continuous rotation of the condensers 3 and 4 which are driven by the motor 18 gives a variation of capacity which is represented by the lines $a$ and $a'$ of Fig. 2 for a complete revolution of the rotors. In this drawing the lines $a$ and $a'$ are straight corresponding to a straight line capacity variation for these condensers. This does not mean that my invention requires such condensers, for on the contrary, other forms of variation may be preferred for special uses.

The maximum capacity proportional to ordinate point M, is obtained when these rotors have entered completely between the fixed plates of the stator.

The periodical displacement of the instantaneous band pass, which is determined by the curve of resonance of the receiver, is obtained by the periodical variation of capacity of condensers 3 and 4 between a value which is practically zero and a maximum and vice versa, due to the continuous rotation of the rotors. The width of the band of frequencies thus periodically covered can be adjusted by tuning the two variable condensers 5 and 6 whose rotors are ganged together.

If the maximum capacity C of the rotating condensers 3 and 4 is equivalent to that of each of the elements 5 and 6, which for example have their rotors completely enmeshed with the stator plates, the maximum capacity resulting for each of the groups of the series 3—5 and 4—6 is equal to C/2.

For any other position of the rotors of condensers 5 and 6 the maximum capacity of each group 3—5 and 4—6 becomes less than C/2.

I employ various methods for adjusting the maximum capacity of the groups of elements 3—5 and 4—6 and consequently of the width of the frequency band periodically covered by the band pass of the set, at each turn of the rotor blades of condensers 3 and 4 rotated by motor 18 as represented in Fig. 1. If the maximum capacity of the variable condensers 1 and 2 is C', it is easy to understand that the origin or lower limit of the band of frequencies periodically swept can occupy, in a total band of frequencies which can be received by my apparatus, any position comprised between the tuning frequency corresponding to the minimum capacity of condensers 1 and 2 and the tuning frequency corresponding to C'.

As illustrated in the drawings, a cathode ray oscillograph tube 17 is combined with the radio receiver to give a visual representation in the chosen band of frequencies of all the signals simultaneously received and to show the respective amplitudes of the signals.

The horizontal deviations of the cathode ray beam between the deflecting plates 9 of tube 17 are produced in exact synchronism and in phase with the periodical displacement of the instantaneous band pass. For this purpose, one of the deflection plates 9 is electrically connected to a saw-tooth wave generator comprising the insulated side of condenser 21 which can be charged by a source of voltage, for example, from point 38 of the source of voltage of the radio receiver. Condenser 21 is connected either directly or through an amplifier to deflecting plate 9 and also through a resistance 23 to a brush 26 on commutator 24, 25. The commutator 24, 25 is mounted on the shaft 19 of motor 18 and permits the sudden discharge of condenser 21 through resistance 23, as indicated at $d$ in Fig. 2 of condenser 21, by means of the grounding brush 27, connected to shaft 19, during each half rotation of motor 18, when the metal part 24 of the commutator 24, 25 is in contact with the brush 26.

As soon as the insulated half 25 of the commutator 24, 25 comes under the brush 26 during another half turn of shaft 19, the condenser 21 is insulated and can be recharged through the resistance 22. In order to obtain the necessary synchronism between the successive charges of the condenser 21 and the periodical displacements of the instantaneous band pass of the set, it is necessary to time the passage of the brush 26 over the separating line between the halves 24 and 25 of the commutator 24, 25, simultaneously with the moment when capacities of the rotating condensers 3 and 4 pass either through minimum or through maximum.

In Fig. 2, the line $b$ represents the variation of voltage between the ends of the condenser 21 as it charges through the resistance 22. This line $b$ is situated underneath the line $a$ which represents the variation of capacities of condensers 3 and 4. For simplicity and understanding of Fig. 2, I have shown straight lines for both capacity as well as the variation of sweeping voltage. This variation does not have to be linear, for in most applications of my invention I require equal spacing between two given frequencies on any part of the image on the screen 30 of the oscillograph 17 and this result can be obtained by varying the curve representing the variation of either variable condenser or of the sweeping voltage or of both.

This arrangement causes a horizontal sweep on the screen 30 of the cathode ray oscillograph 17 according to the line A—B of Fig. 3.

The signal rectified by the detector tube 32, Fig. 1 is applied on deflecting plate 15 which produces a vertical deviation of the cathode ray beam of the oscillograph 17. A variation of the voltage of condenser 21 is visually reproduced on the screen 30 of the oscillograph 17 as a periodical horizontal movement of the light spot while for each signal detected by tube 32 during the rotation of condensers 3 and 4, a vertical displacement of this light spot is produced parallel to the axis y—y of Fig. 3 and of a height proportional to the intensity of the signal. The vertical displacements will be seen on the screen 30 in different positions between A and B corresponding to the frequencies of the signals received. If the speed of rotation of motor 18 is sufficient, the eye will perceive, due to the persistence of visual impressions and due to the persistence of the screen 30 of the cathode ray oscillograph 17, the continuous wave forms of the simultaneously received signals. A continuous curve is reproduced on screen 30 showing a certain number of maxima E, F, G, higher or lower according to the field intensity of the stations, or according to their proximity to the receiver and the distances between E, F, G, corresponding to the difference of frequencies between the sending stations.

Due to these different characteristics, the operator can first modify on the screen 30 of oscillograph tube 17 the position of the band of frequencies desired by tuning the capacities 1 and 2; it is very easy to analyze in its details any region of a certain band of frequencies, a necessity which may be present when the observer must follow the approach to a given station. If more details must be had of a relatively narrow band, the band may be expanded or "blown up" on the cathode ray tube screen in either of two ways, either by increasing the horizontal sweep voltage, as obtainable by the use of a sweep voltage amplifier, or by the variations of the tuning capacities.

Many modifications of the apparatus hereinabove described may be made without departing from the spirit of my invention. For example, the combination of a radio receiver according to my invention with means to periodically displace the band pass can be suppressed if the navigator wishes to hear through the loud speaker 50 certain stations, for example, those giving meteorologic information or time signals, etc. In order to do this it is sufficient to stop the motor 18 by means of the switch 20 or to provide a clutch system to disconnect the condensers 3 and 4 in which can then be adjusted by hand or cutting out the groups of condensers 3, 5, and 4—6 by means of a double pole single throw switch 55.

It may be important to be able to listen to one of the stations received on screen 30 without disturbing the simultaneous visual reception of the others. One of my preferred methods is to combine a panoramic receiver with a conventional type of aural receiver in such a way that the panoramic receiving system creates visual signals on the screen 30 of the oscillograph 17, whereas a separately tuned receiving system gives an aural indication of any one of the signals received. In order to facilitate the identification of the station received aurally, the aural system may be so linked with the panoramic system as to produce a visual indication, on the screen of the oscillograph which permits visually reproduced stations to be identified with the stations to which the observer is listening.

In Fig. 4 the signal collecting or antenna circuit 10 including the coupling primaries 61 and 62 is inductively coupled to such an aural receiving circuit. The latter contains a regenerative stage including a variably coupled feed-back circuit 63 and a detector tube 60. The output of the tube is coupled to an amplifier whose output can be connected to a pair of phones, a loudspeaker or other type of audio responsive device. A condenser 1a is provided for tuning this aural receiving system to any frequency within the band covered by the panoramic receiving system. The latter is also shown in Fig. 4, in simplified form, including a single receiving tube 12 periodically tuned by rotating condenser 3 and motor 18. Condenser 1 permits shifting of the visually received band over a given range of the frequency spectrum. The output of tube 12 is amplied and fed to a vertical plate of an oscillograph 17. The horizontal plate 9 is fed from a sweep voltage generator 21—26, operated in synchronism with the periodically tuned condenser 3. Supposing that the panoramic circuits indicate on the screen 30 of the oscillograph four stations, as shown on Fig. 3 by deflections E, F or G. By tuning the condenser 1a, it is possible to hear each of the above stations in succession, without disturbing their appearance on the screen. If these stations are keyed by Morse code, or have any other visually characteristic modulation, it is possible to identify the signal heard, from among the several signals seen on the screen. If, however, this signal is voice or music modulated, it is necessary to use a "marker" signal, which gives the identification. I can easily produce such a marker signal in the arrangement shown on Fig. 4, by coupling the feed-back circuit 63 to secondary 64 until the tube 60 oscillates. This produces a signal of the frequency to which it is tuned, which signal is fed into the panoramic receiving system with the other signals and will appear on the screen 30 of the oscillograph 17 in a position corresponding to the frequency for which condenser 1a is tuned. This marker signal will move to the right or to the left on the screen according to the position of the condenser 1a, and can be made to coincide with any of the other signals appearing on the screen. In that moment the receiver is tuned exactly in the same frequency as the signal with which it coincides on the screen, and the observer can listen to that station aurally in the output of that receiver.

The condenser 1a can be actually calibrated in frequencies like the screen 30 (Fig. 1) and the observer knows at a glance the frequency of any of the plurality of signals received visually on the screen 30 by referring to this calibration. In certain applications of this system of simultaneous visual and aural reception, I prefer to keep a fixed relationship between the frequencies of the station producing the aural response, and of the total band covered visually. In order to do so, I interlock or gang the condensers 1 and 1a, so as to simultaneously tune the two channels: the visual and the aural circuits. By properly selecting the values of these condensers it is possible to keep the two tuned circuits tracking in frequency so that only signals appearing on a definite portion of the screen are heard in the aural output, irrespectively of the position of the condensers 1 and 1a. In a preferred arrangement these audible signals are those which appear on the median line y—y (Fig. 3), on screen 30, which can be made to represent the center of the visual bandwidth received. As the two condensers 1 and 1a are tuned, the deflections E, F, G, on the screen 30 will move together along the line A—B and every time one of these deflections crosses the vertical axis Y—Y, the respective signal will be heard through the output device of the aural channel. When the condensers are thus ganged, it is not necessary any longer to produce a marker or indicating signal from the aural circuit, appearing on the visual circuit. The feed-back circuit 63 shown on Fig. 4 can, therefore be omitted. Fig. 5 shows a circuit similar to that of Fig. 4, with the difference that instead of coupling the collecting circuit 10 directly to the visual and to the aural receiving systems, it is first coupled to an amplifying stage, including variable condenser 68 and tube 69. The output of this stage is coupled to the visual receiving system through condenser 66 and to the aural receiving system through condenser 67. Such an arrangement will prevent the radiation into the antenna system of the "marker" signal produced in the aural system. In this Fig. 5 the oscillation producing circuit is not shown, however, although it is to be understood taht it can be inserted just as in Fig. 4, or in the following Fig. 6. The condensers 1 and 1a are shown ganged, to indicate that the audible signals will be always visible on a definite portion of the screen.

There are other ways in which I can have aural reception simultaneously with the visual reception. In a more complicated receiver, I use a conventional superheterodyne receiver in connection with the panoramic receiver and use the variable oscillator of the superheterodyne to impress upon the screen of the panoramic receiver a marker signal which will vary in position according to the position of its tuning elements. As the frequency of such an oscillator is generally higher than the frequency of the signal received by an amount equal to the frequency of the intermediate frequency amplifier, this signal will not actually coincide with the signal to which the observer is listening. In order to do so, it is necessary to use a separate fixed oscillator of the same frequency as that of the intermediate frequency amplifier and heterodyne it with the signal from the oscillator of the superheterodyne receiver and then impress the resulting marker signal on the antenna circuit of the panoramic receiver. That signal will coincide with the signal desired. Fig. 6 illustrates this description in the form of a block diagram. A signal input circuit such as shown on Figs. 4 or 5 is coupled to a visual receiving system and a conventional superheterodyne receiver. These are shown within dotted lines. The latter receiver includes: a "mixer" and an "oscillator," both being tunable by ganged condensers 1a, 1b. The mixer is followed by an intermediate frequency stage (I. F.), a detector stage (DET.) and an audio frequency stage (A. F.) and finally by a pair of phones. A beat frequency oscillator in the receiver (B. F. O.) which can be turned "on" at will, emits a signal of a frequency equal to that of the intermediate frequency stage. A certain amount of the oscillator and of the B. F. O. outputs are combined into a mixing circuit ("marker signal mixer") and the output of this is fed to the visual receiving system which is a receiver similar to that shown on Fig. 1.

While I have described my invention in certain preferred embodiments, I realize that my invention is capable of many applications and modifications not mentioned herein. For example, in field surveys for determining the possible location of broadcast stations where frequency allotments by the Federal Communications Commission are becoming so difficult and restricted, the system of my invention is particularly useful.

Other applications of my invention will be apparent and no limitations upon my invention are intended other than may be imposed by the scope of the appended claims.

What I claim as new and desire to secure by Letters Patent of the United States is as follows:

1. A system for simultaneous aural and visual radio reception, comprising a radio signal input circuit, two tunable receiving circuits, means for coupling said input circuit to said receiving circuits, means for simultaneously tuning the receiving circuits over a wide range of the frequency spectrum, said two receiving circuits being interlocked and tunable to the same frequency within the said range; separate and automatic means for periodically varying the resonance of the first of the said receiving circuits over a continuous frequency band extending above and below the said same frequency, means connected with the said first receiving circuit for visually reproducing all signals received over said band, and means connected with the second of said receiving circuits for aurally reproducing the signals received to which the second circuit is resonant.

2. A system for simultaneous aural and visual radio reception as set forth in claim 1, wherein said first of said receiving circuits includes manually adjustable means for varying the width of the said frequency band.

3. A system for simultaneous aural and visual radio reception comprising an antenna circuit, two independent receiving circuits, means for coupling the said circuit to said two independent receiving circuits, the first of said receiving circuits having automatic means for periodically tuning it over a continuous band of the frequency spectrum extending above and below a nominal frequency, a detector and visual output indicating means including a cathode ray oscillograph with a screen, said indicating means operating in synchronism with the automatic tuning means, to indicate on said screen according to their respective frequencies the signals periodically received; the second of the said receiving circuits having tuning means for receiving a signal on the said nominal frequency, a detector and means for connecting the output of the said detector to aural responsive means, and means for simultaneously shifting the band scanned in the first receiving circuit and tuning the second receiving circuit to a new nominal frequency.

4. A system for simultaneous aural and visual radio reception as set forth in claim 3, wherein the said tuning means of the said second receiving circuit is adjusted to receive signals having a nominal frequency corresponding to that visible in the center of the said screen.

5. A radio receiving system for visual reception of a continuous band of the frequency spectrum and simultaneous audio reception of a single signal within the said band, which comprises: a radio signal input circuit coupled to a visual receiving circuit and an aural receiving circuit, said circuits having means for simultaneously tuning them over a wide range of the frequency spectrum, the visual circuit including: automatic means for periodically tuning it over a continuous band of frequencies within the said wide range, a sweep voltage generator operating in synchronism with the said means, a detector, a cathode ray oscillograph having two sets of deflecting elements, connections between one of the said sets of deflecting elements and said generator and means for coupling the other of the said sets of deflecting elements with the said detector; and the said aural receiving circuit including: interlocking means for tuning it within the band of frequencies covered by the visual channel, a detector and means for coupling its output to aural response means.

6. A method of visual radio reception of a continuous band of the frequency spectrum and of simultaneous aural reception of a single signal within the said band, which includes the following steps: receiving the signals present over a wide band of the frequency spectrum, manually selecting the signals present over a fraction of the said wide band automatically, periodically and successively selecting each elementary portion above and below a nominal frequency within the said fraction of the frequency spectrum, at a predetermined frequency sweep rate, successively detecting and amplifying each of the signals received and visually indicating in spaced relationship corresponding to their frequency relationship, and at a rate equal to said sweep rate, each of the detected signals; and separately selecting the signals present on the said nominal frequency, detecting the said signals and converting the detected signals into aural responses; and simultaneously shifting said band to a new position in said spectrum and selecting and aurally reproducing a signal at a new nominal frequency.

7. A system for simultaneous visual reception of all signals within a predetermined portion of the frequency spectrum and of aural reception of one of the said signals, comprising a radio signal source, an independent aural circuit, an independent visual circuit, means for coupling the said source to said independent aural and visual circuits, means for producing, in the aural circuits a marker signal of a frequency corresponding to that of the aurally received signal, means for impressing the said marker signal into the said visual circuit, means for periodically tuning the said visual circuit through a band of frequencies including the signal audible in the aural circuit and means for reproducing on a display surface, as visual signs, in spaced relationship corresponding to their respective frequency relationship, the signals visually received, including the said marker signal.

8. A system as set forth in claim 7, for simultaneous visual reception of all signals within a predetermined portion of the frequency spectrum and of aural reception of one of the said signals, wherein the said means for producing a marker signal includes a tunable oscillator differing by a fixed frequency from the signal to be received.

9. A system as set forth in claim 7, for simultaneous visual reception of all signals within a predetermined portion of the frequency spectrum and of aural reception of one of said signals, wherein the said means for producing a marker signal includes two oscillators and a mixer, the first of said oscillators having a fixed frequency and the second said oscillator having a variable frequency and being tunable in step with the said aural channel.

10. The method of visually and aurally indicating a radio signal, comprising impressing the radio signals of the radio spectrum on a resonant circuit, tuning said resonant circuit to a given frequency in the spectrum, and then periodically varying the tuning of the resonant circuit over a given band within the spectrum, simultaneously visually reproducing all of the signals in said band; selecting and aurally reproducing a single signal within said band, simultaneously shifting the position of the band scanned by the periodic tuning and the frequency of response of the aural reproducing circuit.

11. The method of visually and aurally indicating radio signals comprising receiving, selecting and aurally reproducing the intelligence of a radio signal; receiving, scanning, and visually reproducing all of the signals within a given band of frequencies, including the signal aurally reproduced; and then receiving, selecting and aurally reproducing a second radio signal and simultaneously shifting said band, maintaining the relative frequency position of the second aurally reproduced radio signal in said band.

12. The method of aurally and visually reproducing radio signals as defined in claim 11, including the step of adjusting the relative frequency of the aurally reproduced signal with respect to the upper and lower limits of said band.

13. A system for simultaneous visual and aural reproduction of radio signals, comprising an antenna, a radio frequency amplifier coupled to said antenna, a first resonant circuit coupled to the output of said amplifier, a manually adjustable tuning condenser for changing the resonance in said first circuit, and a second condenser connected in said first circuit means to rapidly and periodically vary the effective capacity of the second condenser to periodically vary the resonance of said first circuit, and means for simultaneously visually reproducing all signals received in the band converted by the periodic tuning; and a second resonant circuit including a manually adjustable tuning condenser coupled to the output of said amplifier, the manual tuning condensers of the two mentioned resonant circuits being mechanically interlocked, and aural signal reproducing means coupled to said second mentioned circuit.

14. An antenna circuit, two resonant tunable radio frequency receiving circuits coupled to said antenna, interlocked and manually adjustable tuning means in said two circuits, one of said circuits having a device for periodically and rapidly tuning said one circuit over a predetermined frequency band, visual signal reproducing means coupled to said one circuit, and aural reproducing means coupled to the other of said circuits.

15. A radio signal source, a first resonant circuit coupled to said source, signal detecting means coupled to said first circuit, a cathode ray tube having two sets of deflection plates, an electron gun and a screen, one set of plates being coupled to said first circuit, a sawtooth wave generator coupled to the other set of deflection plates to trace a base line on the screen, means for periodically tuning said first circuit over a frequency band between predetermined maximum and minimum frequencies, said tuning means and generator being synchronized to indicate, on the screen along the base line, spaced deflections from the base line representative of signals received in said band, the amplitudes of the signals being represented by the amplitudes of deflections and the frequency separations of the signals being represented by the spacial separations of the deflections; a second resonant circuit coupled to said source, and aural responsive means coupled to the second circuit, means to shift said band and move the deflections along the base line, and manual tuning means in said second circuit for tuning the second circuit to a frequency within said band corresponding to a frequency intermediate the ends of the base line, with means to indicate on the screen the frequency of response of the second circuit.

MARCEL WALLACE.

CERTIFICATE OF CORRECTION.

Patent No. 2,367,907. January 23, 1945.

MARCEL WALLACE.

It is hereby certified that error appears in the printed specification of the above numbered patent requiring correction as follows: Page 4, first column, line 35, for "taht" read --that--; page 5, second column, line 51, claim 13, for the word "converted" read --covered--; and that the said Letters Patent should be read with this correction therein that the same may conform to the record of the case in the Patent Office.

Signed and sealed this 15th day of May, A. D. 1945.

Leslie Frazer

Acting Commissioner of Patents.

(Seal)